United States Patent [19]

Mazzola

[11] 4,136,052
[45] Jan. 23, 1979

[54] ENCAPSULATED BLEACHES AND METHODS FOR THEIR PREPARATION

[75] Inventor: Louis R. Mazzola, Mahwah, N.J.

[73] Assignee: Lever Brothers Company, New York, N.Y.

[21] Appl. No.: 842,208

[22] Filed: Oct. 14, 1977

Related U.S. Application Data

[62] Division of Ser. No. 717,718, Aug. 25, 1976, Pat. No. 4,078,099.

[51] Int. Cl.² .................... C11D 7/54; C11D 3/395
[52] U.S. Cl. ........................................ 252/94; 252/99; 427/213; 427/220; 427/221; 428/403; 428/407
[58] Field of Search ................... 252/99, 94, 89; 428/407, 403; 427/220, 221, 213

[56] References Cited

U.S. PATENT DOCUMENTS

| | | | |
|---|---|---|---|
| 3,459,665 | 8/1969 | Schiefer et al. | 252/94 |
| 3,769,224 | 10/1973 | Inamorato | 252/99 |
| 3,908,045 | 9/1975 | Alterman | 427/213 |
| 3,975,280 | 8/1976 | Hachmann | 427/220 |

*Primary Examiner*—George F. Lesmes
*Assistant Examiner*—E. Rollins Buffalow
*Attorney, Agent, or Firm*—James J. Farrell; Melvin H. Kurtz; Ira J. Schultz

[57] ABSTRACT

Bleaching compositions containing coated or encapsulated bleaching agents, methods for employing these coated agents, as well as methods for preparing these encapsulates are disclosed. These compositions and methods are utilized to effectively bleach colored fabrics and textiles in both hot and cold water with minimal pinpoint damage to the fabric colors. The encapsulates have excellent storage properties and release of the active component at both hot and cold temperatures.

19 Claims, No Drawings

ENCAPSULATED BLEACHES AND METHODS FOR THEIR PREPARATION

This is a divisional, of application Ser. No. 717,718, filed Aug. 25, 1976 now U.S. Pat. No. 4,078,099.

The instant invention relates generally to bleaching compositions utilized in combination with detergent compositions. The bleach is kept from reacting with the detergent composition, from losing its bleaching capacity and from pinpoint damage to fabrics, where necessary, by a unique coating system which provides at least two separate coatings on the bleaching agents or granules.

Encapsulation processes and indeed encapsulation for active chlorine bleaches as well as peroxygen bleaches is well known, see for example U.S. Pat. No. 3,908,045 which utilizes a non-aqueous solution of selected fatty acids which are applied to active chlorine granules to improve stability and to reduce the pinholing potential of the bleach. This patent, however, requires the use of a solvent system which is undesirable in certain circumstances. In addition, a number of patents discussing the art of coating bleaching agents are mentioned in the 3,908,045 patent. In addition to these patents, UK 1,107,166 shows the difficulty of incorporating a non-ionic detergent with a chlorine bleach; SA 66/3,919 shows the encapsulation of percompounds with ester or amide type condensation products of fatty acids and ammonia, alkyl or alkylolamines, to deactivate chlorine compounds in a composition. U.S. Ser. No. 359,821 filed on May 14, 1973 to Gougeon, now abandoned, which is the priority document of NE application No. 7,406,389, also deals with selected bleaching compositions which contain coated peroxy acid bleaching granules.

U.S. Pat. No. 3,112,274 discloses a method for coating and agglomerating bleach with inorganic compounds which include the detergent components. Due to the required solubility of the coating components employed, dissolution must of necessity be too rapid to effectively control chlorine release. Thus, while chlorine bleaching is good, pinholing damage will be severe.

Generally, it is known that peroxygen bleaching agents are highly useful for chemical bleaching of colored fabrics and textiles insofar as these bleaching agents are less harsh and more suited for colored fabrics than conventional active chlorine type bleaching agents. The reason for this is that many fabric dyes are susceptible to damage from chlorine bleach, although active chlorine type bleaching agents are preferable because they are stronger and do a much better job of bleaching. These active chlorine containing compounds are generally utilized in solid or granular form if they are to be mixed in with a particulate detergent composition.

Granular products containing chlorine bleaching agents frequently result in fabric color damage. These products are generally added to a dry load of laundry in a conventional washing machine and remain in close contact with fabrics during the time that the conventional washing machines are being filled with water. As the machine fills, local high concentrations or even pastes of the compounds come into contact with the fabric surfaces. When this happens the bleaching conditions on the fabric surface are extremely favorable for color damage and very small spots or pinpoints will appear on the fabric surfaces. These conditions result in damage to the fabric color in a pinpoint pattern.

Pinpoint color damage can be minimized by employing various methods to delay solubility of the bleaching material until after the washing tub has completely filled and agitation has begun. This avoids local areas of high bleach concentration. One method of achieving this delay has been to coat or encapsulate the bleaching granules thereby preventing immediate contact with the wash water. These coatings and the procedures employed have inherent shortcomings. A coating material must be employed which adequately serves to provide the delay indicated above. At the same time, the coating must be of such a nature that it will allow substantially complete release of the bleach into solution during the wash cycle. Thus, it is apparent that two seemingly contradictory results are sought. In addition, the coating material must be of such a nature as not to substantially interfere with the washing process. For example, the material must be such as not to increase soil levels in the wash. Further, an appropriate coating material must aid in stabilization of the chemically reactive bleaching agents during prolonged periods of storage either alone or in admixture with various detergent products. Also, the coating must not react with either the bleaching agent or with the other components of the composition such as detergents or builders. In addition, in order to formulate a practical bleach containing detergent, the composition must not only bleach at high temperatures, such as for example about 135° F., but must also bleach at warm temperatures such as about 100° F. and cold temperatures such as about 75° F. These requirements present an extremely difficult problem in obtaining a bleaching composition which will not pinhole yet will release high effective levels of chlorine at both high and low temperatures. Prior art solutions to the problem have not been completely satisfactory since the coating agents are highly temperature dependent. Thus, when hot water enters the washer, it will immediately melt a coating compound which has a melting point lower than the temperature of the wash water. On the other hand, if the coating material melts at a high temperature and if low wash water temperatures are used, only a small amount of bleach will be released in the wash water. This is a problem if it is desired to release chlorine at lower temperatures for its bleaching and antiseptic properties. It can thus be seen that a method of coating active chlorine bleach granules and a product of good stability prepared by this method which would release high effective amounts of chlorine at both high and low temperatures and which would minimize pinholing on colored fabrics is extremely desirable.

While the problem of pinholing is not serious with oxygen containing bleaching agents, the problem of low and high wash water temperature release coupled with storage stability still exists. Thus a coating system which will substantially diminate these problems is also desirable.

It is therefore an object of the invention to provide a method for preparing encapsulated bleach granules which will not be subject to one or more of the above disadvantages.

Another object is to provide an improved method for preparing encapsulated chlorine granules having a delayed release providing high effective levels of chlorine at both high and low temperatures, and minimal fabric color damage.

Yet another object is to provide a coating for chlorine granules as well as other agents for which controlled release is necessary or required.

A further object is to provide a practical and efficient method of preparing chlorine granules which are stable over a reasonably long period of time and which can be utilized with a granulated detergent composition.

Other objects and advantages will appear as the description proceeds.

The attainment of the above objects is made possible by this invention which includes an encapsulating composition, encapsulated active chlorine bleach granules as well as other granules and methods for preparing the same.

The subject invention overcomes one or more of the disadvantages of the prior art heretofore described. This is accomplished with the advantages that such encapsulation may be more easily achieved; uses more economical and safer starting materials; and will enable inclusion of a bleach granule into a commercially practical detergent composition. An additional advantage is its utility in either high or low temperature wash water with no substantial fabric color damage or pinholing.

With these and other objects in mind, the invention is hereinafter set forth in detail, the novel features thereof being particularly pointed out in the appended claims.

Generally, in the practice of the present invention, the method is performed substantially as follows: the granulated material to be encapsulated is charged into a rotating drum mixer, molten, solvent free combinations of selected fatty acids and waxes are sprayed onto the tumbling granules by means of a two fluid nozzle which is fully described in Alterman, U.S. Pat. No. 3,908,045 which description is hereby incorporated by reference. The molten combination is sprayed in a finely divided state and at a rate which prevents excess agglomeration and results in the application of a coating of the combination on the particles. Materials containing a small amount of fines, up to about 20% and preferably no more than 10%, are agglomerated in situ with some of the coating agent initially sprayed. This initial step, prior to the start of the actual encapsulation, eliminates the need of most prior art processes to pre-screen the material to be encapsulated. The granulated material utilized herein is substantially passed through a U.S. sieve size of about 10 mesh and substantially retained on a U.S. sieve size of about 45 mesh. Fines as used herein may be defined as particles which pass through a U.S. sieve size of about 45 mesh. The internal air temperature of the mixer is critically maintained within the softening range of the coating combination or agent to obtain a coherent coating. Processes not maintaining such temperature control result in less coherent coatings. Without the temperature control a significant portion of the atomized coatings will have solidified prior to contacting the granules. This spray drying effect results in a significant portion of the coating material having no adhesion to the granules.

More specifically, sufficient chlorinating agents are placed in the drum mixer (pre-screening of the fines is unnecessary). The coating agents are placed in a pot with a steam coil and melted together. All coating materials used are preferably entirely miscible when melted. No organic or inorganic liquids other than the melted coating agents are used. The process is thus solventless in the sense that only the coating materials are used. The bulk of the coating material is a non-reactive fatty acid in combination with a microcrystalline wax. It has been found that the melting points of these materials are preferably fairly well-matched.

After melting the coating agents, in the absence of solvents, the separate premixes are prepared. With the mixer rotating and the chlorinating agent tumbling, the coating agent is applied by spray via the two fluid nozzle, previously described, with the use of a pressure pot. This produces a finely atomized spray of coating agent which is directed at the center of the tumbling powder. The rate of application must be sufficient so as to avoid agglomeration which results from localized overwetting. Such a low rate of application results in the building of layer on layer of coating on the particles. The waxes assist in this process by acting as "lubricants" in the application of the layers of coating.

During the application of the coating, it has been found extremely important to maintain an ambient air temperature in the mixer within the softening range of the coating agent to allow the coating to spread around the particle. This is accomplished in any convenient manner, for example, with the use of a simple electric hot air blower. Maintaining this temperature prevents the molten liquid from solidifying too quickly and affords a more coherent coating. By elevating the temperature near the melting point of the coating during the initial stages of the process, agglomeration will occur thereby eliminating any fines present in the powder. When formulas contain multiple coatings, these are simply sprayed back-to-back in sequence.

After spraying all the coating material, the hot air flow into the mixer is shut off and the encapsulated particles are permitted to cool naturally. While this is occurring, if desired, the hot air blowers are directed to the outside shell of the mixer for a sufficient amount of time to heat the metal shell to a temperature at least into the softening range of the coating. Generally in burnishing the particles, heat will be applied to the shell of the mixer for 3-10 minutes, preferably about 5-7 minutes in the softening range of 130°-140° F. As the coated particles roll along the interior wall of the mixer, a burnishing effect takes place. As the particles lose contact with the mixer wall the surface temperature of the particles quickly drop and the coating hardens again. This cycle is repeated until the particles can be seen to have acquired a gloss. This indicates the "burnishing" step is complete and the coherency of the coating has been measurably improved. This encapsulated material is now ready for blending into a detergent powder. Tailings (particles greater than 10 mesh) are generally found to be less than 1%, indicating that screening can be avoided, if desired.

Coating agents with inverse solubility in water may be incorporated into the coating combination described above as either a first or second coat. This inversely soluble material provides for a high effective release of the encapsulate in both hot and cold water, depending on the reactivity of the granulated material or encapsulate. As a final step after spraying the coating agents, the coated particles are preferably burnished by the application of heat on the outer shell of the drum mixer which softens and reforms the outer surface of the coating and improves its coherency. Although this burnishing step is not required, it provides for a more coherent coating and thus greater effectiveness of the coating. It will be apparent that by increasing the amount of coating employed an equivalent effect can be achieved. The use of an excess of coating material, however, is more costly and is thus not desirable.

When employing an active chlorine bleach, the coating of the invention involves a first non-reactive coat which separates the active chlorine containing compound from the second or time control coat. A second or time control coat, including the material having inverse solubility, is then applied over the protective or first coat. In this way materials which may react with the encapsulate can be utilized. Heretofore inclusion of certain desirable but reactive materials could not be achieved. In addition to the second or time control coat, a third coating can be used to further improve the coherency of the coating, and to increase the amount of time necessary for the coating to release the active chlorine containing agents. The first coating is a combination of a fatty acid and preferably a microcrystalline wax. The second coating is a combination of a fatty acid with material which exhibits inverse solubility with respect to temperature. This provides for a greater release of the encapsulate in cold water than in hot water. By this means sufficient delayed release is provided in hot water to prevent pinholing. These materials may be for example pluronic surfactants (a trademark of Wyandotte Chemical Co.) i.e. a condensation product of polyoxypropylene and polyoxyethylene. In addition to this, a wax can be used in the second coating. The third coating, if desired, can be a fatty acid in combination with a wax.

If a compound is used as the encapsulate which is substantially non-reactive as compared to chlorinating agents, then the first, protective coat can be eliminated and the second or time release coat can be utilized directly covering the encapsulate. If in addition color damage is of no concern, then a material which is simply soluble in water and miscible with the other coating components can be substituted for the materials possessing inverse solubility. This still provides a significant benefit in that release of the encapsulate is substantially temperature independent since the water soluble material is leached from the coating causing coating breakdown followed by release of the encapsulate. Substantially non-reactive materials which will benefit from the encapsulation are oxygen-releasing bleaches, such as for example, sodium percarbonate, sodium perborate as well as reducing bleaches such as sodium bisulfite. In addition, other materials which can benefit from controlled release may also be utilized.

The final product then can be an oxidizing or reducing bleach as well as the preferred active chlorine containing bleaching agent encapsulated with the aforedescribed coatings.

When a dual coating is to be applied, it is essential that the first coating contain a major portion of a saturated fatty (alkanoic) acid which is solidifiable and which remains solid at temperatures likely to be encountered during storage and subsequent manufacturing steps such as inclusion into a detergent composition, for example a temperature of about 85°–135° F.

Suitable fatty acids are the well known n-alkanoic acids having from about 12 to about 20 carbon atoms. The critical feature of the fatty acid is its melting point to insure that the coating is substantially independent of wash water temperature. Thus, any combination of these fatty acids which has the required melting point may be used. Small amounts of unsaturated acids are tolerable so long as there is substantially no reaction of the total mixture with the encapsulated material. Various combinations of the acids may thus be utilized. Particularly suitable fatty acids are for example Emersol 150 and Emersol 153 (trademarks of Emery Industries, Inc.). Emersol 150 is essentially a combination of 83% stearic acid, 11% palmitic acid and 6% of other fatty acids, Emersol 153 is essentially a combination of 95% stearic and 5% palmitic acids.

The waxes of the invention are utilized in essence as a plasticizer to improve the flow of the coating around the particles and to improve the coating coherency by reducing the crispness and brittleness of the fatty acid used alone. These waxes may be any substantially saturated non-reactive blend of normal paraffins, isoparaffins, and alkylated naphthenes (cycloparaffins). Preferably microcrystalline waxes having a melting point range of about 125° to 210° F., as measured by the ASTM D-127 melting point test, are employed. These waxes typically have a molecular weight of about 500 to about 750 and a hardness value of about 2 to about 80 as defined by the ASTM needle penetration test at 77° F. (ASTM D-1321).

Particularly preferred are microcrystalline waxes marketed by Witco Chemical Company under the trademark "Multiwax", such as for example Multiwax X 145A having a melting point of about 160° to 170° F. The wax and the fatty acid used should have softening and melting points which are approximately in the same range, for example Multiwax 110 with a $C_{12}$ fatty acid and Multiwax HS with Emersol 153. The amount of wax utilized is sufficient to substantially overcome the brittleness of the fatty acid without making the coating too sticky which will occur if too much wax is used. Generally, about 2% to 18% is included and preferably about 5% to about 15% to insure proper plasticity of the coating without undue stickiness.

The material used to provide a temperature independent release of the encapsulate is used in either the first or second coating depending upon the reactivity of the encapsulate. For chlorine releasing bleach granules, this material will be included in the second coat. The preferred material being a pluronic surfactant is marketed by BASF-Wyandotte Chemical Company.

The pluronic surfactants that may be utilized are fully described in U.S. Pat. No. 2,979,528. The pluronics which may be employed have an average molecular weight of about 8000 to about 16,500. The pluronics are solids and the percent of polyoxyethylene in the molecule is about 65% or greater. The melting point of the mixture of the coating containing the pluronic must melt at close to or above the wash water temperature to be utilized. In addition, PLURAFAC A-38, also marketed by Wyandotte Chemical Company, may also be operable.

These *pluronic surfactants* are preferred because of their inverse temperature solubility in water, i.e. they are less soluble in hot water than in cold water. For encapsulates which pose only a minimum pinholing problem the delay release requirements are less stringent and therefore materials exhibiting normal solubility such as Carbowax 6000, a product marketed by Union Carbide Corporation, will suffice. The Carbowax is a polyethylene glycol polymer having a molecular weight of about 6000.

Generally, the total coating will be 45 to 55% by weight of the total particle. The minimum that can be used is about 35%. The maximum, of course, is not critical except that the coating will be too costly if an excess is used. The amounts of the various layers considered as a percentage by weight of the total encapsulated particle are as follows:

A. Three Coat System (1) layer one, about 5–15%, preferably about 8–12%: the components of layer one are present in the layer in the following amounts:

fatty acid — about 82% to about 98% by weight of layer one, preferably about 85% to 95% by weight;

microcrystalline wax — about 2% to about 18% by weight of layer one, preferably about 5% to about 15% by weight;

(2) layer two, about 25–40%, and preferably about 30–35%: the components of layer two are present in the layer in the following amounts:

fatty acid — about 16% to about 86% by weight of layer two, preferably about 45% to about 76% by weight;

microcrystalline wax — about 0.5% to about 16% by weight of layer two, preferably about 3% to about 12% by weight;

inverse solubility material — about 12% to about 80% by weight of layer two, preferably about 20% to about 47% by weight.

(3) layer three, about 5–15%, and preferably about 8–12%. The components of layer three are present in the layer in the same relative amounts as in layer one above.

In layer two, the amount of the material having inverse solubility is about 5–20%, and preferably about 7–14% of the total encapsulate weight.

B. Two Coat System (1) layer one, about 15–25%, preferably about 18–20%. The components of layer one are present in the layer in the same relative amounts as in layer one of the three coat system above.

(2) layer two, about 30–40%, preferably about 32–38%: the components of layer two are present in the layer in the following amounts:

fatty acid — about 27% to about 86% by weight of layer two, preferably about 48% to about 78% by weight;

microcrystalline wax — about 0.5% to about 16% by weight of layer two, preferably about 3% to about 12% by weight;

inverse solubility material — about 12% to about 67% by weight of layer two, preferably about 18% to about 44% by weight.

In layer two, the amount of inverse solubility material is about 5–20%, preferably about 7–14% or the total encapsulate weight.

C. One Coat System (1) layer one, about 35–55%, preferably about 45–50%. This layer has about 5–20%, and preferably about 7–14% of the total encapsulate weight of the material exhibiting inverse solubility: The components of this layer are present in the layer in the following amounts:

fatty acid — about 35% to about 89% by weight, preferably about 59% to about 82% by weight;

microcrystalline wax — about 1% to about 16% by weight, preferably about 3% to about 13% by weight;

inverse solubility material about 9% to about 57% by weight, preferably about 14% to about 31% by weight.

Among the chlorine-releasing or active-chlorine containing substances suitable as encapsulates, there may be mentioned those oxidants capable of having their chlorine liberated in the form of free elemental chlorine under conditions normally used for detergent bleaching purposes, such as potassium dichloroisocyanurate, sodium dichloroisocyanurate, chlorinated trisodium phosphate, calcium hypochlorite, lithium hypochlorite, monochloramine, dichloramine, nitrogen trichloride [(mono-trichloro)-tetra-(mono-potassium dichloro)]-penta-isocyanurate, 1,3-dichloro-5,5-dimethyl hydantoin, paratoluene sulfondichloroamide, trichloromelamine, N-chloromelamine, N-chlorosuccinimide, N,N'-dichloroazodicarbonamide, N-chloro acetyl urea, N,N'-dichlorobiuret, chlorinated dicyandiamide, trichlorocyanuric acid, and dichloroglycoluril.

Sodium dichloroisocyanurate, typical of the cyanurates suitable as core substances, is commercially available and may be obtained from the Monsanto Chemical Company. The chemical structure of this compound may be represented by the formula

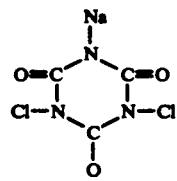

Information regarding this and related compounds may be found in Monsanto Technical Bulletin 1-177. Potassium dichloroisocyanurate, while not preferred, may also be employed.

Additional chlorinated compounds of the type referred to in the instant specification as chlorine-releasing agents, which liberate elemental chlorine under the conditions of use set forth herein, are well known in the detergent, bleaching and sanitizing arts. Disclosures of typical chlorine-releasing agents, preparative procedures, and use in combination with certain detergents and additives may be found collectively in the following list of patents, which is by no means exhaustive.

U.S. Pat. Nos. 1,555,474; 1,950,956; 1,965,304; 2,929,816; 3,035,054; 3,035,056; 3,035,057; 3,110,677; 3,346,502.

Suitable chlorine-releasing agents are also disclosed in the ACS Monogram entitled "Chlorine- Its Manufacture, Properties and Uses" by Sconce, published by Reinhold in 1962.

When utilizing the encapsulated particles of this invention in a detergent formulation the desired chlorine level in the wash solution is about 30 to about 200 parts per million (ppm) available chlorine. The preferred range is about 15 to about 35 ppm to most efficiently utilize the chlorine containing material. These levels determine the amount of encapsulated particles which are incorporated into the detergent formulation.

Encapsulated particles of chlorine-releasing agent prepared in accordance with the instant specification find utility in admixture with particulate detergent compositions having therein anionic and/or nonionic detergent species.

Examples of anionic detergents useful in the detergent-bleach compositions of this invention are the higher alkyl mononuclear aromatic alkali-metal sulfonates, such as alkylbenzenesulfonates having about 9 to 18 carbon atoms in the alkyl group wherein the alkyl group is derived from polypropylene as described by Lewis in U.S. Pat. No. 2,477,382, or wherein the alkyl group is derived from kerosene, as described by Flett in U.S. Pat. No. 2,390,295, and Rubinfeld in U.S. Pat. No. 3,320,174, or wherein the alkyl group is a straight chain and the benzene nucleus is randomly positioned along the alkyl chain, as described in Baumgartner U.S. Pat. Nos. 2,723,240 and 2,712,530 and in U.S. Pat. No. 2,972,583, or wherein the alkyl group is a hexene dimer or trimer as in McEwan U.S. Pat. No. 3,370,100, or wherein the alkyl group is derived from alphaolefins, as in Swenson U.S. Pat. No. 3,214,462.

Also there may be employed primary and secondary alkyl sulfates, i.e. R-O-SO$_3$- compounds wherein R represents an alkyl group having from 10 to 20 carbon atoms such as sodium, potassium and magnesium lauryl sulfate, stearyl sulfate, coconut alkyl sulfate and tallow alkyl sulfate; N-long chain acyl-N-alkyl taurates and the salts thereof wherein the long chain is from 8 to 20 carbon atoms such as sodium oleoyl methyl taurate, sodium palmitoyl methyl taurate, sodium lauroyl methyl taurate and the corresponding acyl ethyl taurates; long chain alkyl-oxyethylene sulfonates wherein the long chain is from 8 to 20 carbon atoms such as sodium or laurylpolyoxyethylene sulfate, sodium lauryloxyethylene sulfate and sodium cetylpolyoxyethylene sulfate; long chain alkyl aryl oxyethylene sulfates wherein the long chain is from 8 to 20 carbon atoms such as ammonium, sodium or potassium nonyl- octyl- and tridecylphenoxy mono- and polyoxyethylene sulfates; long chain acylisethionates wherein the long chain is from 8 to 20 carbon atoms such as sodium or potassium lauroyl- stearoyl isethionate; alkane- or alkenesulfonates containing 8 to 20 carbon atoms in the alkane or alkene group such as sodium or potassium octane-, decane-, tetradecane-, octadecanesulfonate and octene-, decene-, tetradecene- and octadecenesulfonate; alkoxyhydroxy- alkanesulfonates wherein the long chain is 8 to 22 carbon atoms such as lauryloxyhydroxypropanesulfonate, stearyloxyhydroxyethanesulfonate and tallowoxyhydroxypropanesulfonate; and fatty acid monoglyceride sulfates wherein the long chain is 8 to 22 carbon atoms such as lauric-, myristic-, palmitic and stearic monoglyceride sulfates; alpha-sulfo soap, such as disodium salt of alpha-sulfo fatty acids wherein the fatty acids are derived from tallow, the sulfosuccinates, such as dioctyl sulfosuccinate, sodium salt, the sulfuric acid esters of polyhydric alcohols incompletely esterified with higher fatty acids, such as the sodium salt of sulfated coconut oil monoglyceride, and compounds known as "Medialans," which are amido carboxylic acids formed by condensing fatty acids of C$_8$–C$_{22}$ chain length with sarcosine, CH$_3$NH$_2$CH$_2$COOH. Generally the alkali metal salts are employed.

The soaps are included within the definition of anionic detergents as used herein. Operable soaps within the present invention are the sodium and potassium salts of acyclic monocarboxylic acids having chain lengths of about 8 to about 22 carbon atoms. Particularly useful are the salts of unsubstituted fatty acids derived from natural triglycerides, such as tallow, palm oil, cottonseed oil, olive oil, lard, rapeseed oil, etc., and the so-called "high-lauric oils," generally exemplified by the tropical nut oils of the coconut oil class, including in addition to coconut oil, palm kernel oil, babassu oil, ouri curi oil, tucum oil, cohune nut oil, and murumuru oil, and for present purposes, ucuhuba butter, a triglyceride high in myristic acid esters. A particularly useful soap is one prepared from a mixture of about 80% tallow and about 20% coconut oil.

Preferably the detergent composition should be substantially free of compounds containing amino nitrogen to avoid adverse effects during the washing operation.

Other suitable anionic synthetic detergents for use in the present invention can be found in the literature, such as "Surface Active Agents and Detergents" by Schwartz, Perry and Berch published by Interscience Publishers, the disclosures of which are incorporated by reference herein.

Water-soluble polyetheneoxy nonionic organic detergent compounds suitable for use in the practice of the invention may be characterized broadly as ethylene oxide condensates of organic hydrophobic compounds bearing a labile hydrogen atom in a polar substituent, said organic hydrophobic compounds being within a molecular weight range such that when serving as a base for a resulting ethylene oxide condensate, said condensate is capable of having detergent properties at a sufficiently high ethylene oxide content.

Suitable hydrophobic bases falling within the foregoing description are aliphatic alcohols and mixtures thereof having from about 10 to about 15 carbon atoms, corresponding to an average molecular weight of about 158 to about 228. The alcohol is preferably straight-chain, but may contain 0% to about 25% lower alkyl branching, mainly methyl, with some 2–3 carbon alkyl groups, on the 2-position carbon of the alcohol molecule.

Other suitable hydrophobic compounds include
(a) the polyoxypropylene diols which form the hydrophobic base of the Pluronics. "Pluronic" is a trademark of the Wyandotte Chemical Corp. The aforementioned hydrophobic base is water-soluble and has a molecular weight from about 1500 to about 1800.
(b) Alkylphenols having an alkyl group of about 6 to about 12 carbon atoms. The alkyl group may be straight or branched and may be derived from a propylene polymer, diisobutylene, hexene, nonene, or dodecene, for example, or mixtures of these.

The ethylene oxide content of the detergent molecule may range from 52% to about 80% by weight, preferably from about 60% to about 70% by weight.

Among the water-soluble polyetheneoxy organic nonionic detergent compounds useful in the combinations of the instant invention are
(1) condensates of ethylene oxide and a primary or secondary alkanol having about 8 to about 16 carbon atoms, the proportion of combined ethylene oxide being from about 52% to about 80% by weight, and mixtures thereof.
(2) condensates of ethylene oxide and an alkanol having 14–15 carbon atoms with about 25% 2-methyl branching, the proportion of combined ethylene oxide in said condensate being from about 52% to about 80% by weight, and mixtures thereof.
(3) condensates of ethylene oxide and a hydrophobic base selected from the group consisting of the reaction product of propylene oxide and propylene glycol, said reaction product having a molecular weight of about 1800.

The water-soluble polyetheneoxy organic nonionic detergent compounds may include:
(1) Poly (ethylene oxide) condensates of primary or secondary aliphatic alcohols having about 11 to about 15 carbon atoms, said condensates having an average of about 9 molar proportions of ethylene oxide per mole of alcohol, and mixtures thereof.

(2) Poly (ethylene oxide) condensates of primary aliphatic alcohols having about 12 to about 15 carbon atoms and having about 25% lower alkyl branching on the 2-carbon, said condensates having an average of about 9 to about 20 molar proportions of ethylene oxide per mole of alcohol, and mixtures thereof.

(3) A condensate of 1 mole of octylphenol and about 7-8 molar proportions of ethylene oxide.

(4) Poly (ethylene oxide) condensates of linear primary alcohols having about 14-15 carbon atoms, and averaging about 13.5 carbon atoms, and having about 25% lower alkyl branching on the 2-carbons, said condensates having an average of about 13.5 molar proportions of ethylene oxide per mole of alcohol.

(5) The poly (ethylene oxide) condensates of alkylphenols, e.g., the condensation of products of alkylphenols having an alkyl group containing from about 6 to 12 carbon atoms in either a straight chain or branched chain configuration, with ethylene oxide, said ethylene oxide being present in amounts equal to 6 to 25 moles of ethylene oxide per mole of alkylphenol. The alkyl substituent in such compounds may be derived from polymerized propylene, diisobutylene, octene, dodecene, or nonene, for example.

(6) Compounds formed by the simultaneous polymerization of propylene oxide and ethylene oxide, and containing randomly positioned propeneoxy and etheneoxy groups.

As examples of specific nonionic detergent compounds finding utility in accordance with the invention, there may be mentioned:

(A) branched-chain nonyl phenol condensed with about 8-14 molar proportions of ethylene oxide, (B) a mixed $C_{11}$–$C_{15}$ secondary alcohol condensed with 9-14 molar proportions of ethylene oxide, the mixed secondary alcohols having the following approximate chain-length distribution:
2% $C_{10}$
15% $C_{11}$
21% $C_{12}$
23% $C_{13}$
17% $C_{14}$
15% $C_{15}$
7% $C_{16}$, (C) a mixed $C_{14}$–$C_{15}$ alcohol made by the Oxo process condensed with about 9-15 molar proportions of ethylene oxide, and (D) a mixture of about 65% $C_{14}$ and about 35% $C_{15}$ synthetic straight-chain primary alcohols condensed with about 9-15 molar proportions of ethylene oxide.

The compositions of the present invention may be formulated with a detergent builder as a detergency aid, for example, those mentioned hereinafter, to provide a commercially valuable detergent-bleach composition.

The term "builder" as used herein refers to any substance compatible with, and assisting the detergency of the aforementioned combination.

Suitable builder compositions are tetrasodium and tetrapotassium pyrophosphate, pentasodium and pentapotassium tripolyphosphate, carboxymethyloxysuccinate, substituted carboxymethyloxysuccinates and the like, sodium or potassium carbonate, sodium or potassium silicates having an $SiO_2$:$Na_2O$ ratio of about 1:1 to about 3.2:1, hydrated or anhydrous borax, sodium or potassium sesquicarbonate, phytates, polyphosphonates such as sodium or potassium ethane-1-hydroxy-1, 1-diphosphonate, etc.

Also useful are other organic detergent builders such as the sodium or potassium oxydisuccinates, sodium or potassium oxydiacetates, hydrofuran tetracarboxylates, ester-linked carboxylate derivatives of polysaccharides, such as the sodium and potassium starch maleates, cellulose phthalates, semi-cellulose diglycolates, starch, oxidized heteropolymeric polysaccharides, etc. The weight percent of the builder present in the built anionic detergent composition is from an amount of about 6% and up to about 90% and preferably from about 20% to about 60%. Suitably, a builder may be present in the ratios of about 0.5 to about 10 parts by weight, preferably about 2 to about 5 parts by weight, for each part by weight of the detergent component.

Other materials which may be present in the detergent compositions of the invention are those conventionally employed therein. Typical examples include the well-known soil suspending agents, corrosion inhibitors, dyes, perfumes, fillers, optical brighteners, enzymes, germicides, anti-tarnishing agents, and the like. The balance of the detergent composition may be water.

The detergent compositions with which the encapsulated bleaching agents of the invention find utility may have compositions represented by the following components and ranges of proportions thereof:

|  | APPROXIMATE PERCENTAGE |
| --- | --- |
| Anionic or nonionic detergent | 1 – 90% |
| Builder | 0 – 90% |
| Encapsulated bleaching agent | 2 – 25% |
| Optical brightener | 0 – 0.3% |
| Viscosity enhancer | 0 – 1% |
| Water | 5 – 15% |
| Sodium sulfate | 0 – 25% |

Detergent compositions formulated for use in the washing of fabrics in automatic washing machines may contain about 5% to about 30% anionic detergent, about 30% to about 60% of one or more of the builders mentioned hereinabove, and sufficient encapsulated bleaching agent to provide 30-200 parts per million chlorine in the wash water, or approximately 2% to 25% of the agent in the detergent formution. Usually included are about 0.1-0.3% optical brightener, and about 0.4% sodium carboxymethylcellulose or other material as a viscosity enhancing material and if desired, small proportions of other components such as germicides, anti-caking agents, etc. to confer special properties on the product.

When the detergent is soap, and comprises the major proportion of the detergent-bleach product, the soap may be present in amounts from about 60% to about 90%, little or no builder being required, although about 1% to about 10% of an alkaline builder may be advantageous.

When the detergent is nonionic, from about 5% to about 20% is suitable, the balance of the composition being as listed above.

Detergent compositions formulated for mechanical dishwashers and having the encapsulated bleaching agents of the invention therein may contain low proportions of nonionic detergent, for example about 1% to about 4%, and may contain a suds depressant and a high proportion of a builder, for example about 50%–90% of a mixture of sodium tripolyphosphate, sodium carbonate, and sodium silicate.

Pinholing test data and chlorine release test data are obtained in the following manner:

PINHOLE EVALUATION TEST

This test is carried out in a washing machine (standard wash and rinse cycles) using 1 cup of detergent formulation plus sufficient encapsulant calculated to give 30 ppm available chlorine in wash.

Four pieces of blue denim (10" × 10") are placed on top of a six pound load (pillow cases). The powder containing the encapsulant is poured on top of the blue denim to provide the maximum opportunity for fabric damage to the blue denim. The fill up time is 2–3 minutes. Accordingly, delayed release of up to 5 minutes is needed to avoid damage to the fabric.

Damage to the blue denim switches is assessed visually according to the scale
  0 — no pinholing
  1 — slight pinholing
  2 — medium pinholing
  3 — heavy pinholing
An acceptable rating is 0 to 1.

After a normal wash rinse cycle the fabric is removed from the machine, dried and evaluated.

CHLORINE RELEASE TEST

This test is conducted with "standard" wash water temperatures of 135° F., 100° F., and 75° F. (hot, warm, cold). A six-pound "dummy" load of white articles is placed in the machine first. The machine is allowed to fill with water during which time the hot and cold water inlets are adjusted to provide the desired water temperature. With the machine in operation a known quantity of encapsulate together with a normal quantity (1 cup) of a detergent powder is placed in the wash water. If a complete chlorine release profile is desired, then wash water samples are removed after 2, 5, 8, 10 and 12 minutes. These samples are weighed and a standard chlorine analysis by thiosulfate titration is conducted. A comparison of the actual chlorine content of the samples with the theoretical level of available chlorine for release determines the percent chlorine release (usually reported for the 12-minute period).

The results of tests run are reported in individual examples.

The following Examples will more fully illustrate the embodiments of this invention. All parts and proportions referred to herein and in the appended claims are by weight unless otherwise indicated.

EXAMPLE 1

Encapsulated bleach is prepared having the following composition:

|  | | Percent |
|---|---|---|
| sodium dichloroisocyanurate dihydrate | | 47.0 |
| (a)Emersol 150 | Coat 1 | 7.5 |
| (b)Witco X-145A wax | | 0.83 |
| Emersol 150 | | 22.17 |
| Witco X-145A wax | Coat 2 | 2.5 |
| (c)Pluronic F-127 | | 10.0 |

|  | | Percent |
|---|---|---|
| Emersol 150 | Coat 3 | 9.0 |
| Witco X-145A wax | | 1.0 |
|  | | 100.0 |

(a) 83% stearic acid, 11% palmitic acid, 2% myristic acid, 2% margaric acid, 1% pentadecanoic acid, 1% oleic acid,
(b) a microcrystalline wax containing a blend of alkylated naphthenes, isoparaffins and normal paraffins having a melting point of about 145° F to 155° F
(c) a block copolymer of 80% polyoxyethylene and 20% polyoxypropylene with an approximate molecular weight of 13,330.

The first step in preparing a batch of the encapsulated material is to load the batch weight of the sodium dichloroisocyanurate dihydrate into the mixer. The hot air blower is started and the air temperature in the mixer is slowly raised to about 135° F., at which point a portion of Coat 1 is added by a two fluid spray nozzle. With the temperature at or near the melting point of Coat 1, agglomeration of any fines present in the chlorocyanurate occurs. With the air temperature in the mixer lowered below the melting point of Coat 1, the remaining portion of Coat 1 is sprayed. This first coating is also intended to act as a barrier to separate the chlorocyanurate from the Pluronic F-127 in the second coat.

Following addition of Coat 1, the air temperature in the mixer is lowered to 105° F.–110° F. and Coat 2 is sprayed, followed by Coat 3. After spraying Coat 3, the internal air temperature of the mixer is allowed to drop and heat is applied to the outer shell of the mixer to burnish the particles and improve the coherency of the coating.

| A. | % CHLORINE RELEASE IN WASH WATER AFTER 12 MINUTES AT TEMPERATURE INDICATED | |
|---|---|---|
|  | Wash Water Temperature °F | % Chlorine Release |
|  | 135 | 100.0 |
|  | 100 | 87.8 |
|  | 75 | 75.0 |
| B. | Pinhole Rating After Pinhole Test = 0 to 1 | |

The compositions of Examples 2 through 17 inclusive are prepared in exactly the same manner as Example 1 except the number of coats is varied.

EXAMPLE 2

|  | | Percent |
|---|---|---|
| sodium dichloroisocyanurate dihydrate | | 47.00 |
| (a)Emersol 150 | Coat 1 | 16.50 |
| (b)Witco X-145A | | 1.83 |
| Emersol 150 | | 22.17 |
| Witco X-145A | Coat 2 | 2.50 |
| (c)Pluronic F-127 | | 10.00 |
|  | | 100.00 |

(a),(b),(c) as defined under Example 1.

A. | % CHLORINE RELEASE IN WASH WATER AFTER 12 MINUTES AT TEMPERATURE INDICATED

| Wash Water Temperature °F | % Chlorine Release |
|---|---|
| 135 | 74 |
| 100 | 91 |
| 75 | 95 |

B. Pinhole Rating After Pinhole Test = 1

EXAMPLE 3

| | | Percent |
|---|---|---|
| sodium dichloroisocyanurate | | 47.00 |
| (a)Emersol 150 | ⎤ Coat 1 | 7.50 |
| (b)Witco X-145A | ⎦ | 0.83 |
| Emersol 150 | ⎤ | 22.17 |
| Witco X-145A | ⎬ Coat 2 | 2.50 |
| (c)Pluronic F-127 | ⎦ | 10.00 |
| Emersol 150 | ⎤ Coat 3 | 9.00 |
| Witco X-145A | ⎦ | 1.00 |
| | | 100.00 |

(a),(b),(c) as defined under Example 1.

A. | % CHLORINE RELEASE IN WASH WATER AFTER 12 MINUTES AT TEMPERATURE INDICATED

| Wash Water Temperature °F | % Chlorine Release |
|---|---|
| 135 | 85.0 |
| 100 | 100.0 |
| 75 | 75.0 |

B. Pinhole Rating After Pinhole Test = 0 to 1.

C. STORAGE TESTS FOR EXAMPLE 3 UNDER TWO DIFFERENT CONDITIONS ARE TYPICAL FOR ENCAPSULATED PRODUCTS

1. In a high humidity test at 80° F./80% relative humidity, wherein common package boxes become saturated, the encapsulate of Example 3 (10% level) was stored for a 3-month period in aluminum foil wrapped boxes. At the same time a mixture of the unencapsulated chlorocyanurate with Rinso was similarly stored as a control. These boxes containing 100 gram samples were analyzed after 1, 2, and 3 months for chlorine content. In analyzing these samples the contents of the box is divided into 3 samples and titrated in a normal chlorine test. The chlorine data obtained is compared to the initial chlorine content and a percent loss is determined. These data are presented in the table below:

PERCENT CHLORINE LOSS AT 80° F/ 80% RELATIVE HUMIDITY

| | Aluminum Foil Wrapped Box | |
|---|---|---|
| Time Elapsed | Unencapsulated sodium dichloroisocyanurate dihydrate/Rinso | Encapsulated sodium dichloroisocyanurate dihydrate/Rinso |
| 1 month | 13.0 | 0.0 |
| 2 months | 16.0 | 0.0 |
| 3 months | 24.0 | 0.0 |

2. A similar test was conducted at more "normal" conditions namely 95° F./50% Relative Humidity. In this test a common outside wax laminated box was used. Comparison of the encapsulate, at 10% level in Rinso, with the same control is indicated below:

PERCENT CHLORINE LOSS AT 95° F/ 50% RELATIVE HUMIDITY

| | Outside Wax Laminated Box | |
|---|---|---|
| Time Elapsed | Unencapsulated sodium dichloroisocyanurate dihydrate/Rinso | Encapsulated sodium dichloroisocyanurate dihydrate/Rinso |
| 1 month | 20.6 | 0.0 |
| 2 months | 24.5 | 0.0 |
| 3 months | 29.7 | 0.1 |

EXAMPLE 4

| | | Percent |
|---|---|---|
| sodium dichloroisocyanurate dihydrate | | 47.00 |
| (a) Emersol 150 | ⎤ Coat 1 | 16.50 |
| (b) Witco X-145A | ⎦ | 1.83 |
| Emersol 150 | ⎤ | 21.67 |
| Witco X-145A | ⎬ Coat 2 | 1.00 |
| (c) Pluronic F-127 | ⎦ | 12.00 |
| | | 100.00 |

(a),(b),(c) as defined under Example 1

EXAMPLE 5

| | | Percent |
|---|---|---|
| [(monotrichloro)-tetra-(monopotassium dichloro)] Penta isocyanurate | | 51.00 |
| (a)Emersol 150 | ⎤ Coat 1 | 16.50 |
| (b)Witco X-145A | ⎦ | 1.83 |
| Emersol 150 | ⎤ | 16.80 |
| Witco X-145A | ⎬ Coat 2 | 1.87 |
| (d)Pluronic F-108 | ⎦ | 12.00 |
| | | 100.00 |

(a),(b) as defined under Example 1
(d) a block copolymer of 80% polyoxyethylene and 20% polyoxypropylene having a molecular weight of approximately 16,250

EXAMPLE 6

| | | Percent |
|---|---|---|
| potassium dichlorocyanurate | | 50.0 |
| (a)Emersol 150 | ⎤ Coat 1 | 18.0 |
| (b)Witco X-145A | ⎦ | 3.0 |
| Emersol 150 | ⎤ | 15.0 |
| Witco X-145A | ⎬ Coat 2 | 1.0 |
| (c)Pluronic F-127 | ⎦ | 13.0 |
| | | 100.00 |

(a),(b),(c) as defined under Example 1.

EXAMPLE 7

| | | Percent |
|---|---|---|
| sodium dichloroisocyanurate dihydrate | | 52.0 |
| (c)Emersol 153 | ⎤ Coat 1 | 21.6 |
| (f)Witco HS | ⎦ | 2.4 |
| Emersol 153 | ⎤ | 14.0 |
| Witco HS | ⎬ Coat 2 | 2.0 |
| (d)Pluronic F-108 | ⎦ | 8.0 |
| | | 100.0 |

(d) as defined under Example 5.

(e) 95% stearic acid, 5% palmitic acid
(f) a microcrystalline wax containing a blend of alkylated naphthenes, paraffins and isoparaffins having a melting point of 160°–170° F.

EXAMPLE 8

|  | Percent |
|---|---|
| [(monotrichloro)-tetra-(monopotassium dichloro)] Penta isocyanurate | 55.0 |
| (e)Emersol 153 ⎤ Coat 1 | 18.0 |
| (f)Witco HS ⎦ | 2.0 |
| Emersol 153 ⎤ | 9.5 |
| Witco HS ⎥ Coat 2 | 0.5 |
| (c)Pluronic F-127 ⎦ | 15.0 |
|  | 100.0 |

(c) as defined under Example 1.
(e) and (f) as defined under Example 7.

EXAMPLE 9

|  | Percent |
|---|---|
| 1,3-Dichloro 5,5-Dimethyl Hydantoin | 47.00 |
| (a)Emersol 150 ⎤ Coat 1 | 16.50 |
| (b)Witco X-145A ⎦ | 1.83 |
| Emersol 150 ⎤ | 22.17 |
| Witco X-145A ⎥ Coat 2 | 10.00 |
| (d)Pluronic F-108 ⎦ | |
|  | 100.00 |

(a) and (b) as defined under Example 1.
(d) as defined under Example 5.

EXAMPLE 10

|  | Percent |
|---|---|
| 1,3-Dichloro 5,5-Dimethyl Hydantoin | 51.0 |
| (e)Emersol 153 ⎤ Coat 1 | 18.0 |
| (f)Witco HS ⎦ | 2.0 |
| Emersol 153 ⎤ | 13.5 |
| Witco HS ⎥ Coat 2 | 1.5 |
| (c)Pluronic F-127 ⎦ | 14.0 |
|  | 100.0 |

(c) as defined under Example 1.
(e) and (f) as defined under Example 7.

EXAMPLE 11

|  | Percent |
|---|---|
| Sodium Percarbonate | 65.33 |
| (a)Emersol 150 ⎤ | 22.17 |
| (b)Witco X-145A ⎥ Coat 1 | 2.50 |
| (d)Pluronic F-108 ⎦ | 10.00 |
|  | 100.00 |

(a) and (b) as defined under Example 1.
(d) as defined under Example 5.

EXAMPLE 12

|  | Percent |
|---|---|
| Sodium Perborate | 47.00 |
| (a)Emersol 150 ⎤ Coat 1 | 16.50 |
| (b)Witco X-145A ⎦ | 1.83 |
| Emersol 150 ⎤ | 22.17 |
| Witco X-145A ⎥ Coat 2 | 2.50 |
| (d)Pluronic F-108 ⎦ | 10.00 |
|  | 100.00 |

(a) and (b) as defined under Example 1
(d) as defined under Example 5.

EXAMPLE 13

|  | Percent |
|---|---|
| Sodium Sulfite | 75.0 |
| (a)Emersol 150 ⎤ | 16.0 |
| (b)Witco X-145A ⎥ Coat 1 | 1.8 |
| (d)Pluronic F-108 ⎦ | 7.2 |
|  | 100.0 |

(a) and (b) as defined under Example 1.
(d) as defined under Example 5.

EXAMPLE 14

|  | Percent |
|---|---|
| Sodium Percarbonate | 60.0 |
| (g)Emersol 132 ⎤ Coat 1 | 28.0 |
| (h)Carbowax 6000 ⎦ | 11.2 |
|  | 100.0 |

(g) 50% palmitic acid, 42.5% stearic acid, 2.5% myristic acid, 1.5% margaric acid, 0.5% pentadecanoic.
(h) polyethylene glycol of molecular weight about 6000.

EXAMPLE 15

|  | Percent |
|---|---|
| sodium dichloroisocyanurate | 47.00 |
| (a)Emersol 150 ⎤ Coat 1 | 16.50 |
| (b)Witco X-145A ⎦ | 1.83 |
| Emersol 150 ⎤ | 22.17 |
| Witco X-145A ⎥ Coat 2 | 2.50 |
| (i)Pluronic F-98 ⎦ | 10.00 |
|  | 100.00 |

(a) and (b) as defined under Example 1.
(i) a block copolymer of 80% polyoxyethylene 20% polyoxypropylene having a molecular weight of about 13,750

EXAMPLE 16

|  | Percent |
|---|---|
| [(monotrichloro)-tetra-(monopotassium dichloro)]Penta isocyanurate | 50.00 |
| (a)Emersol 150 ⎤ Coat 1 | 16.50 |
| (b)Witco X-145A ⎦ | 1.83 |
| (e)Emersol 153 ⎤ Coat 2 | 23.67 |

-continued

| | Percent |
|---|---|
| (j)Pluronic F-68 | 8.00 |
| | 100.00 |

(a) and (b) as defined under Example 1
(e) as defined under Example 7
(j) a block copolymer of 80% polyoxyethylene, 20% polyoxypropylene having a molecular weight of about 8,750

EXAMPLE 17

| | | Percent |
|---|---|---|
| potassium dichlorocyanurate | | 52.00 |
| (a)Emersol 150 | ⎤ Coat 1 | 16.50 |
| (b)Witco X-145A | ⎦ | 1.83 |
| (e)Emersol 153 | ⎤ Coat 2 | 17.67 |
| (k)Pluronic F-88 | ⎦ | 12.00 |
| | | 100.00 |

(a) and (b) as defined under Example 1
(e) as defined under Example 7
(k) a block copolymer of 80% polyoxyethylene, 20% polyoxypropylene having a molecular weight of about 11,200.

It is found that Examples 4 through 10 and 15 through 17 have results similar to Examples 1 through 3. Examples 11 through 14 showing peroxygen bleaches and reducing bleaches are similar in storage and release results to Example 3.

This invention has been described with respect to certain preferred embodiments and various modifications thereof will become obvious to persons skilled in the art, and are to be included within the spirit and purview of this application and the scope of the appended claims.

What is claimed is:

1. A granulated active chlorine bleaching agent encapsulated with a coating comprising:
    (a) about 15 to about 25% of the total encapsulate weight of a first coating on said agent consisting essentially of a major proportion of a substantially saturated fatty acid being substantially non-reactive with said agent and having a melting point range of about 85° F. to about 135° F. and a plasticizing amount of a microcrystalline wax having a melting point range of about 125° F. to about 210° F.; and
    (b) about 30% to about 40% of the total encapsulate weight of a second coating on said first coating, said second coating consisting essentially of a major proportion of a fatty acid, a sufficient amount of said microcrystalline wax to plasticize said second coating and about 5 to about 20% of the total encapsulate weight of a polyoxyethylene-polyoxypropylene copolymer having at least about 65% by weight of polyoxyethylene and having a molecular weight of about 8000 to about 16,500.

2. A bleaching agent as defined in claim 1 wherein said first coating is about 18 to about 20% of the total encapsulate weight and wherein said second coating is about 32% to about 38% of the total encapsulate weight.

3. A bleaching agent as defined in claim 1 wherein the fatty acid of said first coating is at least one n-alkanoic acid of about 10 to 20 carbon atoms.

4. A bleaching agent as defined in claim 3 wherein said fatty acid is a mixture selected from the group consisting of
    (a) about 83% stearic acid, about 11% palmitic acid and about 6% of n-alkanoic acid of about 12 to about 20 carbon atoms other than stearic or palmitic acid, and
    (b) about 95% stearic acid and about 5% palmitic acid.

5. A bleaching agent as defined in claim 1, said agent being capable of substantially passing through a U.S. sieve size of about 10 mesh and at least about 80% of said agent being substantially retained on a U.S. sieve size of about 45 mesh.

6. A detergent composition for use in washing articles incorporating a sufficient amount of the encapsulated granules of claim 1 to provide about 30 to about 200 parts per million of chlorine in the wash water during use.

7. A detergent composition as defined in claim 6 comprising:

| | Approx. Percentage By Weight |
|---|---|
| anionic or nonionic detergent | 1-90% |
| builder | 0-90% |
| said encapsulated bleaching agent | 2-25% |
| optical brightener | 0-0.3% |
| viscosity enhancer | 0-1% |
| sodium sulfate | 0-25% |
| water       Balance to | 100%. |

8. A granulated active chlorine bleaching agent encapsulated with a coating comprising:
    (a) about 5% to about 15% of the total encapsulate weight of a first coating on said agents, said first coating consisting essentially of a major portion of a substantially saturated fatty acid being substantially non-reactive with said agents and having a melting point range of about 85° to about 135° F. and a plasticizing amount of a microcrystalline wax having a melting point range of about 125° F. to about 210° F.;
    (b) about 25% to about 40% of the total encapsulate weight of a second coating on said first coated agents, said second coating consisting essentially of a major proportion of a fatty acid, a sufficient amount of said microcrystalline wax to plasticize said second coating and about 5 to about 20% by weight of the total encapsulated weight of a polyoxyethylene-polyoxypropylene copolymer having at least about 65% by weight of polyoxyethylene and having a molecular weight of about 8000 to about 16,500; and
    (c) about 5% to about 15% of the total encapsulate weight of a third coating on said second coated agents, said third coating consisting essentially of a major portion of a fatty acid and a sufficient amount of said microcrystalline wax to plasticize said third coating.

9. A bleaching agent as defined in claim 8 wherein said first coating is about 8 to about 12% of the total encapsulate weight, wherein said second coating is about 30% to about 35% of the total encapsulate weight and wherein said third coating is about 8 to about 12% of the total encapsulate weight.

10. A bleaching agent as defined in claim 8 wherein the fatty acid of said first coating is at least one n-alkanoic acid of about 12 to about 20 carbon atoms.

11. A bleaching agent as defined in claim 32 wherein said fatty acid is a mixture selected from the group consisting of:
   (a) about 83% stearic acid, about 11% palmitic acid, and about 6% of n-alkanoic acids of about 12 to about 20 carbon atoms other than stearic or palmitic acid, and
   (b) about 95% stearic acid and about 5% palmitic acid.

12. A bleaching agent as defined in claim 8, said agent being capable of substantially passing through a U.S. sieve size of about 10 mesh and at least about 80% of said agent being substantially retained on a U.S. sieve size of about 45 mesh.

13. A detergent composition for use in washing articles incorporating a sufficient amount of the encapsulated granules of claim 8 to provide about 30 to about 200 parts per million of chlorine in the wash water during use.

14. A detergent composition as defined in claim 13 comprising:

|  | Approx. Percentage By Weight |
|---|---|
| anionic or nonionic detergent | 1-90% |
| builder | 0-90% |
| said encapsulated bleaching agent | 2-25% |
| optical brightener | 0-0.3% |
| viscosity enhancer | 0-1% |
| sodium sulfate | 0-25% |
| water    Balance to | 100%. |

15. A granulated bleaching agent encapsulated with a coating comprising:
   (a) about 35% to about 55% of the total encapsulate weight of a coating on said agents consisting essentially of a major proportion of a fatty acid being substantially non-reactive with said agents and having a melting point range of about 85° F. to about 135° F., a plasticizing amount of a microcrystalline wax having a melting point range of about 125° F. to about 210° F.; and
   (b) about 5% to about 20% by weight of the total encapsulate weight of a polyoxyethylene-polyoxypropylene copolymer having at least about 65% by weight of polyoxyethylene and having a molecular weight of about 8000 to about 16,500.

16. A bleaching agent as defined in claim 15 wherein said coating is about 7 to about 14% of the total encapsulate weight.

17. A bleaching agent as defined in claim 15 wherein said fatty acid is at least one n-alkanoic acid of about 12 to about 20 carbon atoms.

18. A bleaching agent as defined in claim 17 wherein said fatty acid is a mixture selected from the group consisting of:
   (a) about 83% stearic acid, about 11% palmitic acid, and about 6% of n-alkanoic acids of about 12 to about 20 carbon atoms other than stearic or palmitic acid, and
   (b) about 95% stearic acid and about 5% palmitic acid.

19. A detergent composition comprising:

|  | Approx. Percentage By Weight |
|---|---|
| anionic or nonionic detergent | 1-90% |
| builder | 0-90% |
| encapsulated bleaching agent | 2-25% |
| optical brightener | 0-0.3% |
| viscosity enhancer | 0-1% |
| sodium sulfate | 0-25% |
| water    Balance to | 100% | wherein said encapsulated bleaching agent is the bleaching agent of claim 15.

* * * * *

UNITED STATES PATENT AND TRADEMARK OFFICE
CERTIFICATE OF CORRECTION

PATENT NO. : 4,136,052

DATED : January 23, 1979

INVENTOR(S) : Louis R. Mazzola

It is certified that error appears in the above-identified patent and that said Letters Patent are hereby corrected as shown below:

Column 21, line 4, the number "32" should be changed to the number --10--.

Signed and Sealed this

Sixth Day of May 1980

[SEAL]

*Attest:*

SIDNEY A. DIAMOND

*Attesting Officer*     *Commissioner of Patents and Trademarks*